Patented Mar. 17, 1931

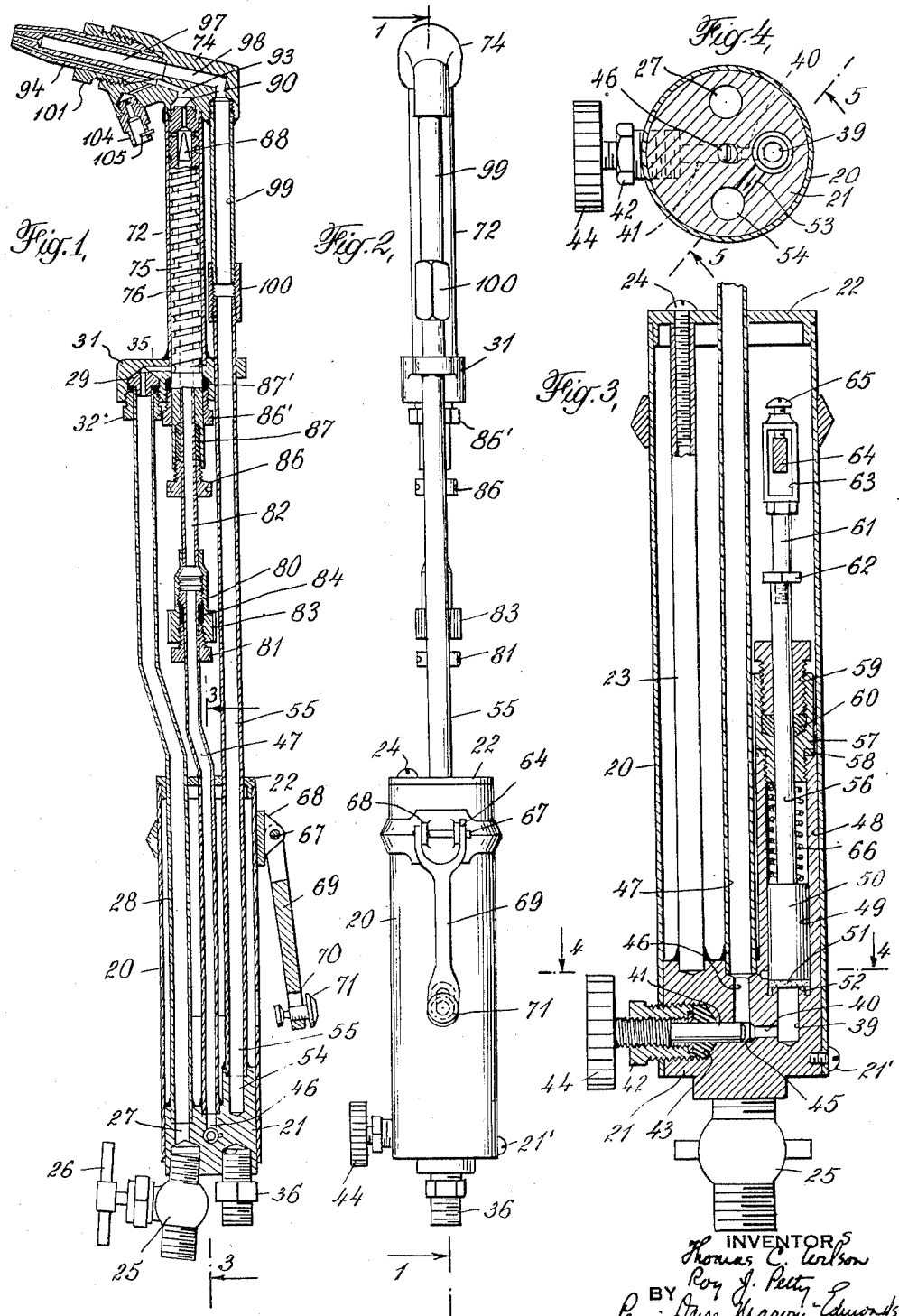

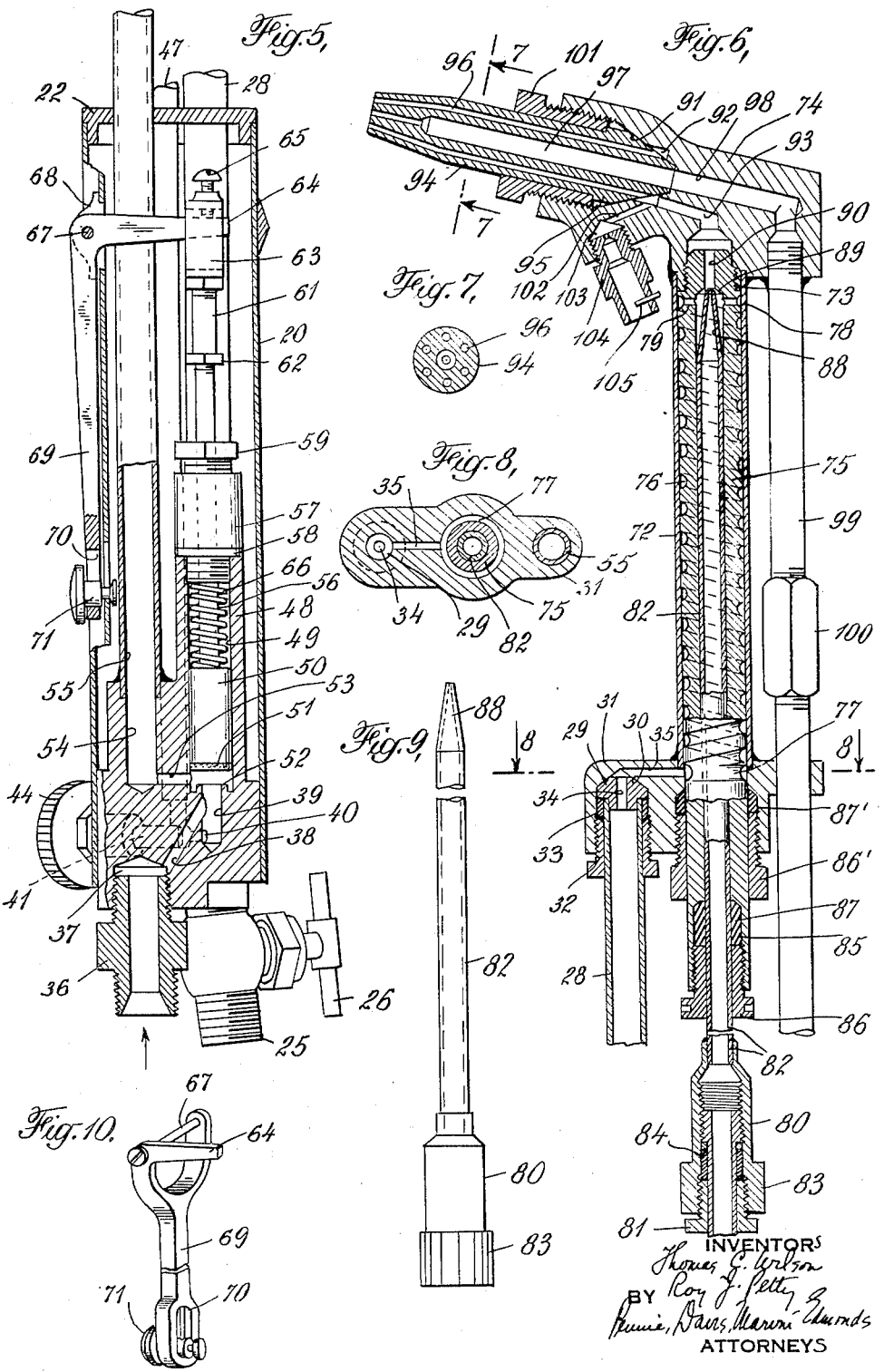

1,796,776

UNITED STATES PATENT OFFICE

THOMAS C. WILSON, OF BROOKLYN, AND ROY J. PETTY, OF NEW YORK, N. Y., ASSIGNORS TO LIQUID FUEL CUTTING & WELDING TORCH CORPORATION

LIQUID-FUEL-BURNING TORCH

Application filed November 25, 1929. Serial No. 409,481.

This invention relates to torches of the type in which a combustible mixture of fuel and oxygen is burned with the generation of high temperature. More specifically, the present invention is concerned with a torch in which liquid fuel, such as gasoline, is employed as the combustible, the liquid being vaporized in the torch and mixed with oxygen to produce a mixture which is burned at a tip. The new torch finds its greatest utility in the cutting of metals by means of a jet of pure oxygen, the flame resulting from the burning of the combustible being used in the ordinary manner to raise the temperature of the metal to the point at which the oxygen may act upon it. For purposes of illustration of an embodiment of the invention, the new torch will be described in a form suitable for cutting purposes, though it is to be understood that the principles of the invention may be incorporated in torches for heating purposes only.

The torch herein illustrated and described is in many respects similar to that which forms the subject-matter of our application Serial No. 352,691, filed April 5, 1929, which has resulted in Patent Number 1,773,418 issued August 19, 1930, but is an improvement thereon with respect to numerous features of construction, the use of which produces a torch which is easy to take apart and put together, so that the torch may be kept clean and in good condition at all times. The new torch also includes various other improvements on the prior torch which lengthens its life, reduce the cost of manufacture and increase its efficiency.

For a better understanding of the invention, reference may be had to the accompanying drawings, in which Fig. 1 is a longitudinal sectional view of the torch on the line 1—1 of Fig. 2;

Fig. 2 is a view of the torch in side elevation;

Fig. 3 is an enlarged sectional view on the line 3—3 of Fig. 1;

Fig. 4 is a transverse sectional view on the line 4—4 of Fig. 3;

Fig. 5 is a longitudinal sectional view on the line 5—5 of Fig. 4;

Fig. 6 is a sectional view similar to Fig. 1 but showing only part of the torch and on an enlarged scale;

Figs. 7 and 8 are sectional views on the lines 7—7, and 8—8, respectively, of Fig. 6;

Fig. 9 is a view of a part of the torch in side elevation; and

Fig. 10 is a perspective view of the torch trigger.

Referring now to the drawings, the torch is shown as including a handle 20 of tubular form extending between a pair of blocks 21 and 22. Secured to the inner face of the block 21 is a tube 23 threaded interiorly at its opposite end to receive a screw 24 which passes through block 22. The latter has a neck receivable in the end of the handle, so that by tightening the screw 24, the handle and blocks may be drawn together to make a rigid structure. The handle tube encircles block 21 and is secured thereto by a set screw 21'.

Mounted in the outer end of block 21 is a valve 25 to which may be attached a supply line (not shown) for leading liquid fuel to the torch from a suitable receptacle. The liquid is placed under pressure in the receptacle and flows to the torch under control of valve 25 provided with a regulating handle 26. A passage 27 leads through block 21 to the valve and in the end of the passage is mounted a tube 28 which is welded, brazed or otherwise secured in place. This tube extends up through the handle and out through an opening in the block 22. At its outer end, the tube 28 terminates in an enlarged head 29 with a tapered face 30. The head is seated in a block 31, entering an opening in the block and held in place therein by a nut 32 which encircles the tube 28 and is threaded into the opening. The nut bears against packing 33 interposed between the nut and the rear face of the head 29, the packing preventing leakage and with the nut holding the head in place against the tapered seat in the block. There is a passage 34 through the head which communicates with a passage 35 in the block.

The oxygen line from the tank (not shown) is connected to a coupling 36 threaded into an opening 37 in the block 21. From the opening a passage 38 in the block leads to a chamber 39 and a side passage 40 from the chamber leads to a valve. This valve has a stem 41 threaded into a gland nut 42 which bears against packing 43 seated in an opening in the block 21. The valve has a handle 44 and by means of the handle the valve stem may be adjusted with reference to its seat 45 in the passage 40. Beyond the seat a passage 46 in the block leads to a tube 47 mounted in the block and secured in position by welding, brazing, or the like. Oxygen thus flows from the supply line to the tube 47 under control of the valve.

In an extension 48 from the inner face of block 21 is a valve chamber 49 in which is the valve head 50 provided at its lower end with a valve disc 51. The extension 48 is drilled to provide a chamber in which the valve is placed and the inner end wall of the chamber is reamed to provide a circumferential rim or seat 52 (Fig. 5) against which the disc is seated. A passage 53 leads from the chamber 49 above the seat to a passage 54 in the block and mounted in the block in communication with this passage is a tube 55 welded, brazed, or otherwise secured in position. Above the head 50 the valve is provided with a stem 56 which passes through a nut 57 threaded into the block 21 in the end of the chamber 49, packing 58 being interposed between the lower end of the nut and the block. A second nut 59 encircling the stem is threaded into the first nut 57 and packing 60 is interposed between the nuts. The stem 56 extends out through the nuts and into its outer end is threaded a rod 61 with a lock nut 62 serving to hold the rod against accidental displacement. On the other end of the rod is mounted a stirrup 63 in which is received one arm 64 of a trigger. This arm bears against an adjusting screw 65 in the stirrup. A spring 66 encircles the valve stem bearing at one end against the valve head 50 and at the other against the inner end of the nut 57, the spring normally holding the valve against its seat (Fig. 3).

The trigger (Fig. 10) is mounted on a pin 67 in a yoke 68 encircling and secured to the handle, the arm 64 projecting through an opening in the handle and entering the stirrup. The trigger has a second arm 69 having a slot 70 in its end and in this slot is mounted a double-headed pin 71. A slot is provided in the handle to receive one head of the pin, and this slot has an enlarged portion through which the head may freely pass, and another portion which is restricted, so that the pin may be inserted in the slot, when the arm 69 is depressed, and then caught and held to retain the arm in depressed position. When the trigger is in this position, the arm 64 draws the valve head free of its seat and oxygen is free to flow from the supply line to the tube 55, the amount of flow being regulated by the adjusting screw 65. The oxygen tube 55 anchored at one end in the block 21 passes through an opening in block 22 and through an opening in the intermediate block 31.

Welded, brazed, or otherwise secured to the block 31 in communication with a passage therethrough is a tube 72, the upper end of which fits over a neck 73. The tube 75 has a spiral channel 76 in its outer surface and the tube fits the tube 72 snugly, so that the two tubes cooperate to form a spiral passage extending from one end of the tube 75 to the other. Near one end of tube 75, there is a circumferential channel 77 which communicates with passage 35 in block 31 and leads the liquid fuel to one end of the spiral passage. Near the other end of the tube 75 is a circumferential channel 78, to which a second circumferential channel 78, to which the spiral passage leads, and a plurality of ports 79 are formed in tube 75 to lead from channel 78 to the interior of the tube.

The tube 47 for oxygen for combustion terminates in a head 80, this head being exteriorly threaded. Encircling the tube is a nut 81 which is freely movable on the tube. Aligned with tube 47 is a valve tube 82 which carries an adjustment nut 83 fast on one end, this nut being threaded on head 80 and receiving nut 81. Packing 84 is interposed between the head 80 and nut 81 to prevent leakage. By turning the nut 83, the tube 82 may be moved endwise relative to the tube 47 without leakage of oxygen.

The tube 75 has an enlarged chamber 85 at its lower end and the tube 82 passes through this chamber and through tube 75 to a point near the other end thereof. A gland nut 86 threaded into the end of tube 75 encircles tube 82 and bears against packing 87, which prevents leakage around tube 82. Leakage around the tube 75 is prevented by a nut 86' threaded into block 31 and bearing against packing 87' surrounding tube 75. At its upper end, tube 82 terminates in a nozzle 88 which cooperates with a seat 89 in the interior of tube 75 to form a valve. Fuel flowing through the spiral passage and through ports 79 flows through the valve and thence into passage 90 at the end of tube 75. By moving tube 82 endwise, the space between its tapered end and the seat 89 may be regulated and the opening provided determines the rate of flow of the fuel to the torch head.

In the head 74 there is formed a chamber having a frusto-conical end-wall 91 and in this wall is cut a channel 92. A passage 93 leads from the interior of the neck 73 to the channel. Mounted in the chamber is a tip 94 having a head 95 with a frusto-conical wall. A plurality of passages 96 lead through the tip to the channel 92. Through the axis of the tip is a passage 97 which communicates with a passage 98 in the head leading to a tube 99 welded or otherwise secured to the head. The tube 99 is connected to tube 55 by a coupling 100 and oxygen for cutting is thus conducted to the central passage in the tip. The tip is held in place in the head by a nut 101 threaded into the head and forcing the end of the tip against its seat.

Formed in the head and opening into the passage 93 is a passage 102 leading to a chamber 103 in which is mounted a preheater tip 104 directing a flame against the outer surface of tube 72. In the wall of the preheater tip and projecting into the flame issuing therefrom is a pin 105 of heat retaining non-oxidizing metal such as nichrome, so that should the torch be extinguished, the heat retained by the pin will cause the preheater flame to be re-ignited.

The operation of the torch is as follows: Oxygen for combustion enters from the supply line and flows through valve 41 to tube 47, and tube 82 to the nozzle 88. Liquid fuel flows from the line through valve 25 and tube 28 to intermediate block 31, thence through the spiral passage to the interior of the tube 75 through ports 79. As the liquid flows through the spiral passage, it is vaporized by the heat of the preheater flame and the vapor mingles with the oxygen issuing from nozzle 88 and the combustible mixture flows through passage 93 to channel 92 and thence issues through the tip passage 96. Part of the combustible mixture is diverted to the preheater tip through passage 102. The amount of fuel vapor in the mixture is regulated by endwise movement of the tube 82 and the amount of oxygen by valve 41. Cutting oxygen passes through passage 39 under control of valve 50 to tube 55 and thence through tube 99 to the central passage in the tip.

Due to the high heat of the oxygen-fuel mixture burned in the preheater tip, carbon deposits sometimes occur in the spiral passage and it is important, therefore, that the torch be readily taken apart for cleaning, so that it may operate at highest efficiency. In the present torch, it will be observed that the tubes 28, 47 and 55 are all rigidly secured at one end to the block 21. The other end of tube 28 is held in place in intermediate block 31 by a nut 32, on removal of which the tube is free of the block. The valve tube 82 is mounted on the end of the tube 47 and tube 75, into which the valve tube 82 is received, is threaded into the neck 73. By removing the packing nuts 86 and 86', the block 31 may be slipped from the ends of the tubes 28 and 82 and thereafter the tube 75 may be unthreaded from the neck 73. Both main and preheater tips are removably connected to the head and may be removed readily for cleaning. By unscrewing the screw 24, the block 22 may be slipped from the end of the handle tube 20 and the handle tube may then be removed by unscrewing the valve 41 and the screw 21'.

The handle tube ordinarily requires removal only to the extent necessary to get at the valve 50 and the valve stem is made up of the rod 56 and rod 61 which can be taken apart without difficulty so that the valve head with the stem 56 attached may be removed from the valve chamber. With the construction described, therefore, it will be apparent that the entire torch may be readily taken apart and in particular the inner tube 75, which with the outer tube 72 constitutes the vaporizing unit, can be removed and cleaned. Tube 72 is rigidly secured at opposite ends to the block 31 and the head 74, but by unscrewing the tube 75 from the head, this tube can be removed so that the spiral passage in it and the various ports through it can be cleaned and carbon removed. The torch can be taken apart for repair and adjustment by the operator and quickly assembled and placed in operating condition without difficulty.

What we claim is:

1. In a torch, the combination of a head, a main burner, a preheater burner mounted on the head, an outer tube against which the flame from said burner is directed, and an inner tube within said outer tube and having an open channel in its surface closed by said outer tube to form a passage for fuel, one of said tubes being permanently connected to said head and the other being removably held in place.

2. In a torch, the combination of a head, a main burner, a preheater burner mounted on the head, an outer tube against which the flame from said burner is directed, an inner tube within said outer tube and having an open channel in its surface closed by said outer tube to form a passage for fuel, said outer tube being permanently connected to said head and said inner tube being rigidly but removably held in place.

3. In a torch, the combination of a head, a main burner, a preheater burner mounted on the head, an outer tube against which the flame from said burner is directed, an inner tube within said outer tube having an open channel in its surface closed by said outer tube to form a passage for fuel, and a block, one of said tubes being permanently secured to said block and to said head, the other of said tubes being removably held in place.

4. In a torch, the combination of a head, a main burner, a preheater burner mounted on the head, an outer tube against which the flame from said burner is directed, an inner tube within said outer tube having an open channel in its surface closed by said outer tube to form a passage for fuel, and a block, said outer tube being rigidly secured to the head, and said inner tube extending into an opening in said head and removably held in place.

5. In a torch, the combination of a head, a main burner, a preheater burner mounted on the head, an outer tube against which the flame from said burner is directed, an inner tube within said outer tube having an open channel in its surface closed by said outer tube to form a passage for fuel, and a block, said outer tube being permanently secured to said block and said head, and said inner tube extending into an opening in said block and being held in place by threads.

6. In a torch, the combination of a head, a main burner, a preheater burner mounted on the head, an outer tube, an inner tube within the outer tube, said inner tube having a channel in its surface closed by the inner wall of said outer tube to form a passage for fuel, said preheater burner directing a flame against said outer tube adjacent said passage, a neck on said head in which said inner tube is removably mounted, said outer tube receiving said neck, a block to which said outer tube is rigidly attached, said block having an opening through which said inner tube passes, and means for preventing leakage along the portion of said inner tube in said opening.

7. In a torch, a block having a pair of tubes connected thereto, one for oxygen, the other for fuel, a second block, means for removably securing the end of the fuel tube to the second block, a head, an outer tube leading from the second block to the head, an inner tube within the outer tube and having an open channel in its surface closed by said outer tube to form a fuel passage, a passage in the second block leading from the fuel tube to the fuel passage, a tube extending into said inner tube and leading to a chamber having a seat, said tube terminating in a valve and cooperating with said seat, and said tube being connected adjustably to said oxygen tube, said fuel passage leading to said chamber, and a head having a passage leading from said chamber, the flow of fuel from said fuel passage to the passage in said head being controlled by the valve end on said tube.

8. In a torch, a handle including a block having a pair of tubes connected thereto, one for oxygen, the other for fuel, a second block, means for securing the end of the fuel tube to the second block, and a second oxygen tube adjustably mounted on the first oxygen tube outside said handle, said second oxygen tube passing freely through the second block.

9. In a torch, a block having a pair of tubes connected rigidly thereto, one for oxygen, the other for fuel, a second block, means for securing the fuel tube removably to the block, a head, means for conducting fuel from the fuel tube to the head comprising a pair of tubes one within the other defining a passage between them, and a second oxygen tube adjustably mounted on the first and passing freely through the second block and extending into the inner tube of said pair of tubes.

10. In a torch, a head, a block spaced therefrom, a second block spaced from the first block, a tube mounted rigidly on said second block, a second tube mounted adjustably on said first tube and extending through the first block, said second tube terminating in a valve end, and a valve seat adjacent said head with which said valve end cooperates.

11. In a torch, a block having three tubes rigidly secured thereto, a head having a tube rigidly secured thereto and coupled to one of the tubes on said block, a tube connected to the second tube on said block and leading to a passage in said head but free of said head, a second block connected to the end of the third tube on said first block, and conduit means connecting said second block and the head, said means being in communication with said third tube through a passage in said second block.

12. In a torch, a block having three tubes rigidly mounted therein, means for supplying fuel to one tube, means for supplying oxygen to the other tubes, a second block, a head, means for securing the end of the fuel tube to the second block in communication with a passage therein, conduit means connecting said second block to the head, said conduit means including an outer tube permanently connected to said head and second block and an inner tube within said outer tube and removably held in place, said inner tube and said outer tube cooperating to define a conduit communicating with said passage in the second block, a tube adjustably mounted on one of said oxygen tubes and extending through said inner tube, said adjustable tube terminating in a valve end, and a seat in said head with which said valve end cooperates to control flow from said conduit into said head.

13. In a torch, the combination of a head, a main burner mounted on said head, a preheater burner mounted on said head, a block spaced from the head, an outer tube seated at one end in the block and extending to the head, an inner tube within the outer tube and having an open channel in its surface closed by said outer tube to form a passage for fuel, said inner tube being seated at one end in an opening in the head, and means for securing the inner tube in place.

In testimony whereof we affix our signatures.

THOMAS C. WILSON.
ROY J. PETTY.